(12) United States Patent
Okuhara et al.

(10) Patent No.: US 6,495,767 B2
(45) Date of Patent: Dec. 17, 2002

(54) GROMMET

(75) Inventors: Takashi Okuhara, Mie (JP); Yoshimi Uchida, Mie (JP); Tsutomu Sakata, Mie (JP); Kenichiro Akizuki, Aichi (JP)

(73) Assignees: Sumitomo Wiring Systems, Ltd., Yokkaichi (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/956,870

(22) Filed: Sep. 21, 2001

(65) Prior Publication Data

US 2002/0036097 A1 Mar. 28, 2002

(30) Foreign Application Priority Data

Sep. 22, 2000 (JP) .......................... 2000-288700
Jan. 25, 2001 (JP) .......................... 2001-017532
Jan. 25, 2001 (JP) .......................... 2001-017561

(51) Int. Cl.$^7$ .............................................. H01B 17/26
(52) U.S. Cl. ................. 174/152 G; 174/65 G; 174/153 G; 16/2.1; 248/56
(58) Field of Search .................. 174/65 G, 152 G, 174/153 G, 65 R, 65 SS, 151, 135; 16/2.1, 2.2; 248/56

(56) References Cited

U.S. PATENT DOCUMENTS

| | | | |
|---|---|---|---|
| 3,518,359 A | * | 6/1970 | Trimble et al. |
| 3,584,888 A | * | 6/1971 | Lott ................... 174/153 G X |
| 4,901,395 A | * | 2/1990 | Semrau ........................... 16/2 |
| 5,739,475 A | * | 4/1998 | Fujisawa et al. ........ 174/153 G |
| 6,058,562 A | * | 5/2000 | Satou et al. ........ 174/153 G X |

FOREIGN PATENT DOCUMENTS

| | | |
|---|---|---|
| DE | 19904549 | 8/2000 |
| EP | 0888931 | 1/1999 |
| FR | 2547452 | 12/1984 |
| JP | 2-125518 | 10/1990 |
| JP | 9-69320 | 3/1997 |
| JP | 9-82161 | 3/1997 |
| JP | 10-12072 | 1/1998 |
| JP | 11-27834 | 1/1999 |

OTHER PUBLICATIONS

English Language Abstract of DE 199 04 549.
English Language Abstracts of Japan, vol. 1997, No. 07, published Jul. 31, 1997.
English Language Abstract of FR 2 547 452.
English Language Abstract of JP 9–82161.
English Language Abstract of JP 10–12072.
English Language Abstract of JP 11–27824.

* cited by examiner

Primary Examiner—Chau N. Nguyen
Assistant Examiner—Dhiru R Patel
(74) Attorney, Agent, or Firm—Greenblum & Bernstein, P.L.C.

(57) ABSTRACT

A grommet has a plurality of inner projecting strip portions and a plurality of outer projecting strip portions on inner and outer peripheral surfaces of the tapered portion, respectively. The plurality of inner and outer projecting strip portions respectively extend in an axial direction of the tapered portion and are spaced from each other in a circumferential direction. The outer projecting strip portions are located opposing to the inner projecting strip portions. A projection amount of the outer projecting strip portions is changed at a contact point. At the contact point, when the grommet is inserted into a through hole, the grommet first contacts an inner peripheral surface of the through hole. The projection amount between the contact point and a large diameter side end of the projecting strip portions is smaller than a second projection amount between the contact point and a small diameter side end.

12 Claims, 16 Drawing Sheets

GROMMET

BACKGROUND OF THE INVENTION

1. Field of Invention

This invention relates to a grommet. In particular, this invention relates to a grommet that engages around a wire harness to be mounted on an automobile, and is mounted in a through hole of an automobile body panel, and improves protection of the wire harness at a position where the wire harness passes through the hole, as well as improving waterproofness and dustproofness.

2. Description of Related Art

Conventionally, a grommet engages around a wire harness to be mounted to extend from an engine compartment to a passenger compartment of an automobile, and the grommet is mounted in a though hole in an automobile body panel that divides the engine compartment from the passenger compartment. Thus, the wire harness passing through the through hole is protected, and intrusion of water, dust and. sound from the engine compartment side to the passenger compartment side is prevented.

As the grommet described above, a so-called one motion grommet is provided. When the one motion grommet is simply pressed into the through hole in the automobile body panel from one side to the other, an automobile body engagement recessed portion provided on an outer peripheral surface of the grommet engages with an edge of the through hole.

As shown in FIG. 17, the above-described grommet 1 is provided with a small-diameter cylindrical portion 2, and a tapered portion 3 which extends from an end of the small-diameter portion 2. The tapered portion 3 is provided with an automobile body engagement recessed portion 4 around a larger diameter end. Both side walls facing each other across a groove 4a of the automobile body engagement recessed portion 4 include a vertical wall 4b at the larger diameter side and an inclined wall 4c at a smaller diameter side. A wire harness W/H (FIG. 18) is inserted into a hollow portion extending from the small-diameter cylindrical portion 2 to the tapered portion 3 of the above-described grommet 1, and the grommet 1 is fixed with the wire harness W/H using a tape T at an end of the small-diameter cylindrical portion.

As shown in FIG. 18, during a mounting operation of the grommet 1 into the through hole H of the automobile body panel P, the grommet 1 is inserted into the through hole H from the small-diameter cylindrical portion 2, and the inclined wall 4c is pressed inwardly and deformed to pass through the through hole 4. Then, the inclined wall 4c, which recovers its original shape after passing through the through hole H, and the vertical wall 4b are tightly pressed into contact with both surfaces of the automobile panel P, respectively. Thus, the automobile body engagement recessed portion 4 of the grommet 1 engages with the through hole H of the automobile body panel P.

However, as shown in FIGS. 19(A) and 19(B), when the one motion grommet 1 is inserted into the through hole H so as to be inclined, one side of the tapered portion 3 is pressed excessively, and thus, an outer peripheral surface of a thin portion of the tapered portion 3, extending to the inclined wall 4c of the automobile body engagement recessed portion 4, is deformed inwardly. The inclined wall 4c, which must be bend inwardly, is bent and warped (flipped over) outwardly, and the inclined wall 4c touches the automobile body panel P. Thus, the grommet is prevented from passing through the through hole H.

When the grommet 1 is inserted straight so that the center axis of the grommet 1 is aligned with the center of the through hole H, the above-described problem does not occur. However, during the insertion operation of the grommet 1 into the through hole, it is sometimes difficult to insert the grommet 1 into the through hole straight, because of the restriction on a space. Thus, in many cases, the grommet is inserted in an inclining posture.

Further, if the tapered portion of the grommet 1 is thick so as to be incapable of being bent, the above-described problem is resolved to a certain extent. However, in that case, an insertion force required to insert the grommet into the through hole become larger.

On the other hand, if the tapered portion is too thin, since the stiffness of the tapered portion becomes small, and thus, the tapered portion becomes easily extended while the inserting operation is performed, an insertion stroke becomes long.

Accordingly, the present invention is provided in view of the above-described problems, and an objective of the present invention is to prevent the insertion force from being too large, and to enable a grommet to be mounted into a through hole of an automobile panel, even if the grommet is inserted in an inclining posture, and to reduce extension of the grommet at the time of insertion into the through hole and thus, to shorten the insertion stroke.

SUMMARY OF THE INVENTION

To achieve the above and/or other goals, the present invention provides a grommet configured to engage around an outer periphery of a wire harness and to be mounted in a through hole of an automobile body panel. The grommet includes a generally cylindrical portion, a tapered portion extending from one end of the generally cylindrical portion and a plurality of projecting strip portions provided on an outer peripheral surface of the tapered portion. The tapered portion includes an automobile body engagement recessed portion provided on an outer peripheral surface of the tapered portion to engage with the automobile body panel. The plurality of projecting strip portions extend in an axial direction of the tapered portion and are spaced from each other in a circumferential direction, A projection amount of the plurality of projecting strip portions is changed at a point in the axial direction so that a first projection amount between the contact point and a large diameter side end of the plurality of projecting strip portions is smaller than a second projection amount of the plurality of projecting strip portions between the contact point and a small diameter side end of the plurality of projecting strip portions. The above-described contact point is located substantially at a position where an outer surface of the plurality of projecting strip portions first contacts an inner peripheral surface of the through hole when the grommet is inserted into the through hole from the end of the grommet having the generally cylindrical portion.

Preferably, the grommet is made of a suitable elastic material, such as an elastic or an elastomer, similar to the conventional grommet.

If the projecting strip portions that extend in an axial direction and spaced from each other in a circumferential direction are provided on the outer peripheral surface of the tapered portion of the grommet, when the grommet is inserted in an inclining posture, first, the projecting strip portions touch the inner peripheral surface of the through hole. Accordingly, the operator can recognize the inclined insertion and can reinsert the grommet in a straight manner.

The above-described automobile body engagement portion can include a vertical wall at a large diameter end side of the tapered portion, and an inclined wall that faces the vertical wall across a groove. The inclined wall is bent inwardly to enable the grommet to pass through the through hole.

Preferably, the projecting strip portions provided on the outer peripheral surface of the tapered portion extend between an end connecting to the generally cylindrical portion to an edge of the inclined wall of the above-described automobile body engagement recessed portion.

As described above, if the projecting strip portions are provided on the outer peripheral surface of the taper end portion, the tapered portion is strengthened (reinforced). When the grommet is inserted in an inclining posture, the phenomenon in which the thin tapered portion extending to the inclined wall of the automobile body engagement recessed portion is warped outwardly (flipped over) at the side contacting the inner peripheral surface of the through hole, does not occur. Accordingly, the problem that occurred at the time of inclined insertion in the conventional grommet can be obviated.

Thus, the projection amount of the above-described projecting strip portions is changed at a contact point where the projecting strip portions contact an inner peripheral surface of the through hole during the insertion into the through hole, so that the projection amount between the contact point and a large diameter side end of the projecting strip portions becomes small.

Accordingly, when the grommet is inserted in the through hole of the automobile body panel, since the projection amount of the projecting strip portions changes, a tactile sensation is generated when the contact point reaches the panel position. From this contact point, the inclined wall must be pressed to be bent inwardly. Thus, from the time when the tactile sensation is generated, if the operator increases the force to press the grommet into the through hole without stopping, the inserting operation of the grommet into the through hole becomes efficient. In addition, since the projection amount of the projecting strip portions becomes small from the contact point, the inserting force can be reduced.

Preferably, an outer surface of the plurality of the projecting strip portion has an arced shape between the contact point and the large diameter side end, i.e., the edge of the inclined wall of the automobile body engagement recessed portion.

As described above, if the arced shape is formed between the contact point and the edge of the inclined wall of the automobile body engagement recessed portion, the grommet can be pressed toward and inserted into the through hole smoothly along the inner peripheral surface of the through hole. Accordingly, the tactile feel at the time of operation can be improved.

Instead of the arc, an outer peripheral surface of the plurality of projecting strip portions can be bent at the point so as to have different inclination angles.

In addition, preferably, the outer surface of the plurality of projecting strip portions extends parallel to the axial direction from a position where a height of the plurality of projecting strip portions from an axis of the grommet becomes equal to a height of an edge of a small-diameter-side (second side) wall of the automobile body engagement recessed portion.

In other words, the outer surface of the projecting strip portion that changes the inclination angle at the contact point, further changes the inclination angle at the position where the height thereof (from the axis of the grommet) become the same as that of the edge of the inclined wall. In other words, the projection amount of the projecting strip portion is gradually decreased. Thus, the inclination angle of the outer surface of the projecting strip portion with the axis changes at three levels. At the small diameter cylindrical side, the inclination angle is the largest. At the contact point, the inclination angle is decreased. Further, when the height of the outer surface of the projecting strip portion (from the axis) becomes the same as that of the edge of the inclined wall, the inclination angle is set to 0. Accordingly, both the correction of the inclination and the reduction of the inserting force into the through hole can be achieved.

According to the another aspect of the present invention, a grommet configured to engage around an outer periphery of a wire harness and to be mounted in a through hole of an automobile body panel is further provided. The grommet includes a generally cylindrical portion, a tapered portion extending from one end of the generally cylindrical portion, and a plurality of inner projecting strip portions provided on an inner peripheral surface of the tapered portion. The tapered portion includes an automobile body engagement recessed portion provided on an outer peripheral surface of the tapered portion to engage with the automobile body panel. The plurality of inner projecting strip portions extend in an axial direction of the tapered portion and are spaced from each other in a circumferential direction.

As described above, if the inner projecting strip portions are provided on the inner peripheral surface of the tapered portion, the stiffness of the grommet can be increased to a certain degree by which an excessive extension of the tapered portion does not occur during the grommet insertion operation into the through hole, and a flipped-over (warp) condition of the grommet at the time of the inclined insertion does not occur. In addition, the insertion stroke can be reduced. Further, since the inner projecting strip portions provided on the inner peripheral surface of the tapered portion extend in the axial direction, the action of the tapered portion reducing the diameter thereof is not prevented at the time of the inserting operation. On the contrary, the inner projecting strip portions works to equally reduce the diameter of the tapered portion toward the center thereof.

The grommet can further includes a plurality of outer projecting strip portions provided on an outer peripheral surface of the tapered portion. The plurality of outer projecting strip portions extend in an axial direction of the tapered portion and are spaced from each other in a circumferential direction. The plurality of outer projecting strip portions are located opposite the plurality of inner projecting strip portions.

A projection amount of the plurality of outer projecting strip portions is changed at a contact point in the axial direction so that the projection amount between the contact point and a large diameter side end of the plurality of outer projecting strip portions is smaller than a second projection amount of the plurality of outer projecting strip portions between the contact point and a small diameter side end of the plurality of outer projecting strip portions. The above-described contact point is located substantially at a position where an outer surface of the plurality of projecting strip portions first contacts an inner peripheral surface of the through hole when the grommet is inserted into the through hole from the generally cylindrical portion.

Preferably, the outer projecting strip portions provided on the outer peripheral surface of the tapered portion extend between a connection end, which connects to the generally cylindrical portion and the edge of the inclined wall of the automobile body engagement recessed portion.

As described above, when the outer projecting strip portions are provided on the outer peripheral surface of the grommet, and when the grommet is inserted in an inclining posture, first, the outer projecting strip portions touch the inner peripheral surface of the through hole. Accordingly, the operator can recognize the inclined insertion, and reinsert the grommet in a straight condition.

Further, if the outer projecting strip portions are provided on the outer peripheral surface of the tapered portion as well as the inner projecting strip portions provided on the inner peripheral surface of the tapered portion, when the grommet is inserted in an inclining posture, the phenomenon in which the thin tapered portion extending to the inclined wall of the automobile body engagement recessed portion is warped outwardly (flipped over) at the side contacting the inner peripheral surface of the through hole, does not occur. Accordingly, the problem that occurred at the time of inclined insertion in the conventional grommet can be obviated.

In particular, even if the height of the outer projecting strip portions provided on the outer peripheral surface of the tapered portion is small, the inner projecting strip portions are provided on the inner peripheral surface of the tapered portion opposite the outer projecting strip portions. Thus, the combined thickness of the outer projecting strip portions and the inner projecting strip portions is large, and the required reinforcement can be obtained. Accordingly, the height of the outer projecting strip portions provided on the outer peripheral surface of the tapered portion can be small, and thus, the profile of the entire grommet is prevented from being larger.

BRIEF DESERTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

Figure 1:
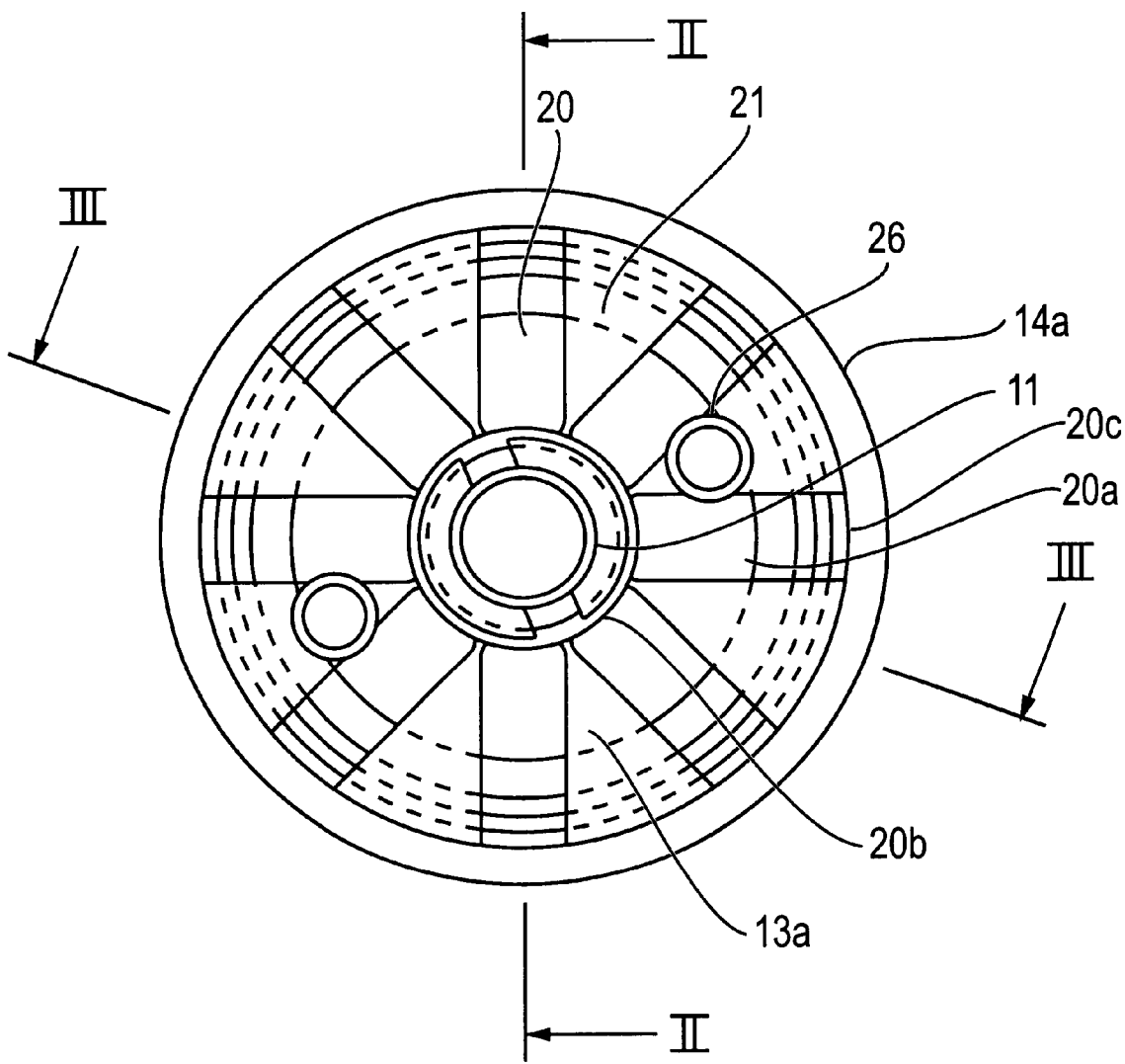
FIG. 1 is a front view of a grommet according to a first embodiment of the present invention.
Figure 2:
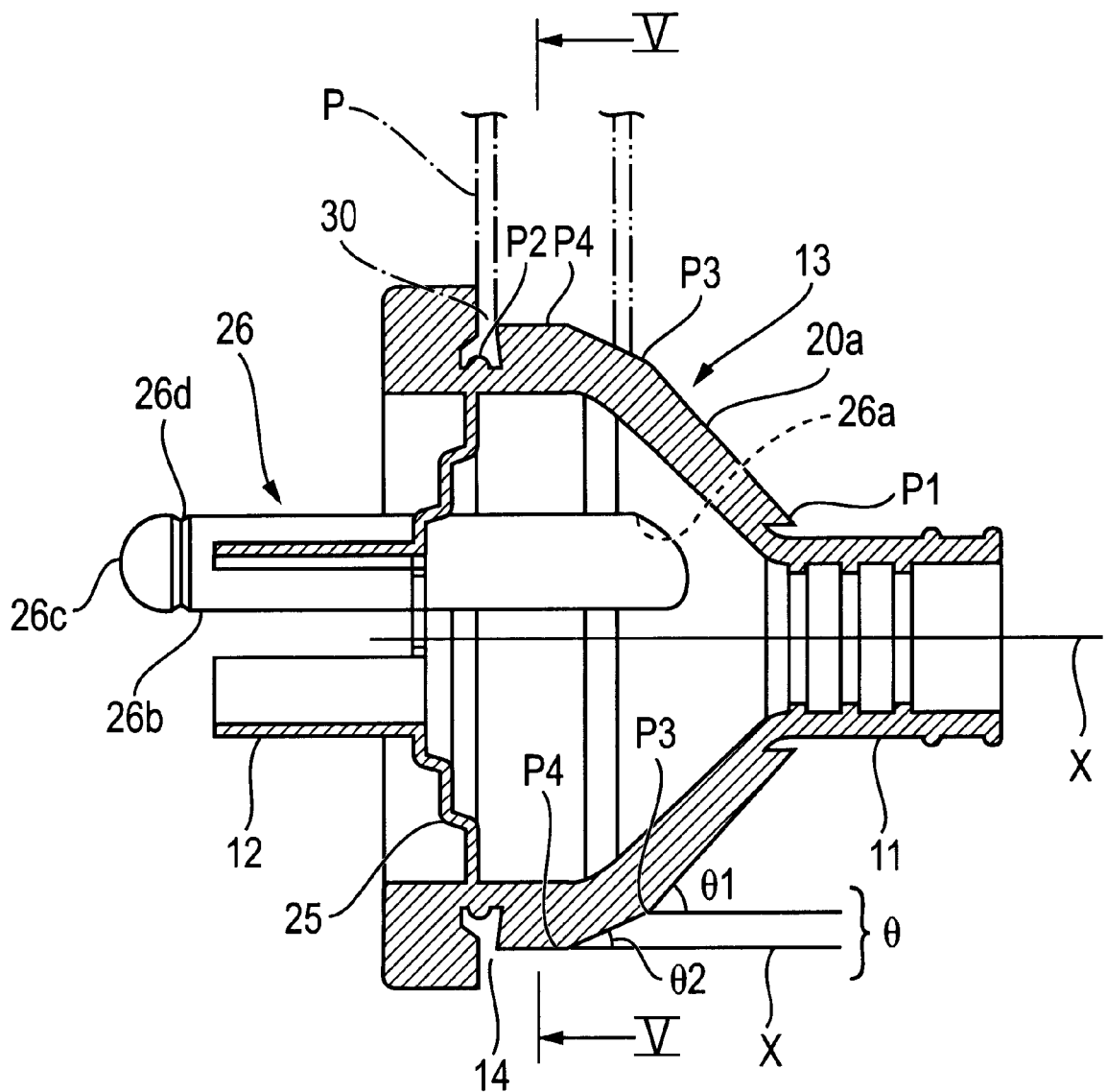
FIG. 2 is a cross-sectional view of the grommet shown in FIG. 1 taken along the line II—II of FIG. 1.
Figure 3:
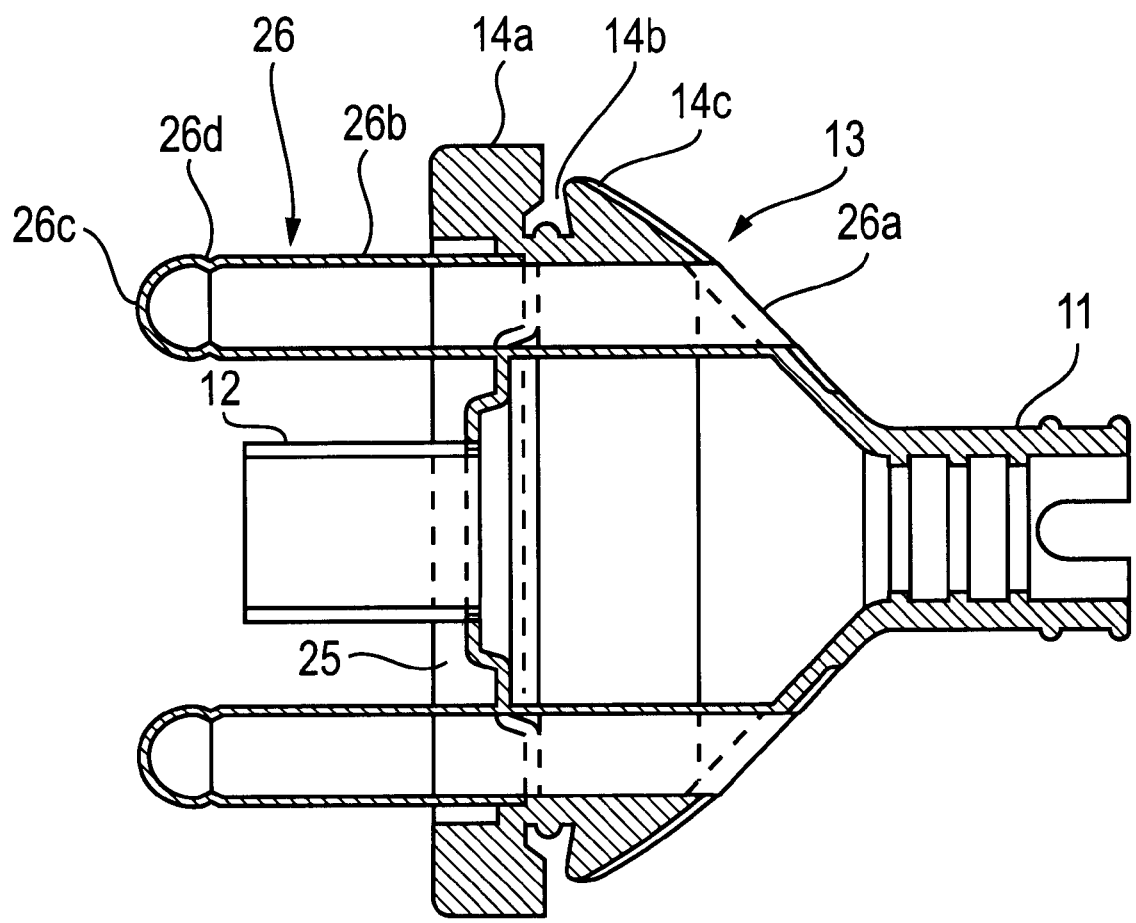
FIG. 3 is a cross-sectional view of the grommet shown in FIG. 1 taken along the line III—III of FIG. 1.
Figure 4:
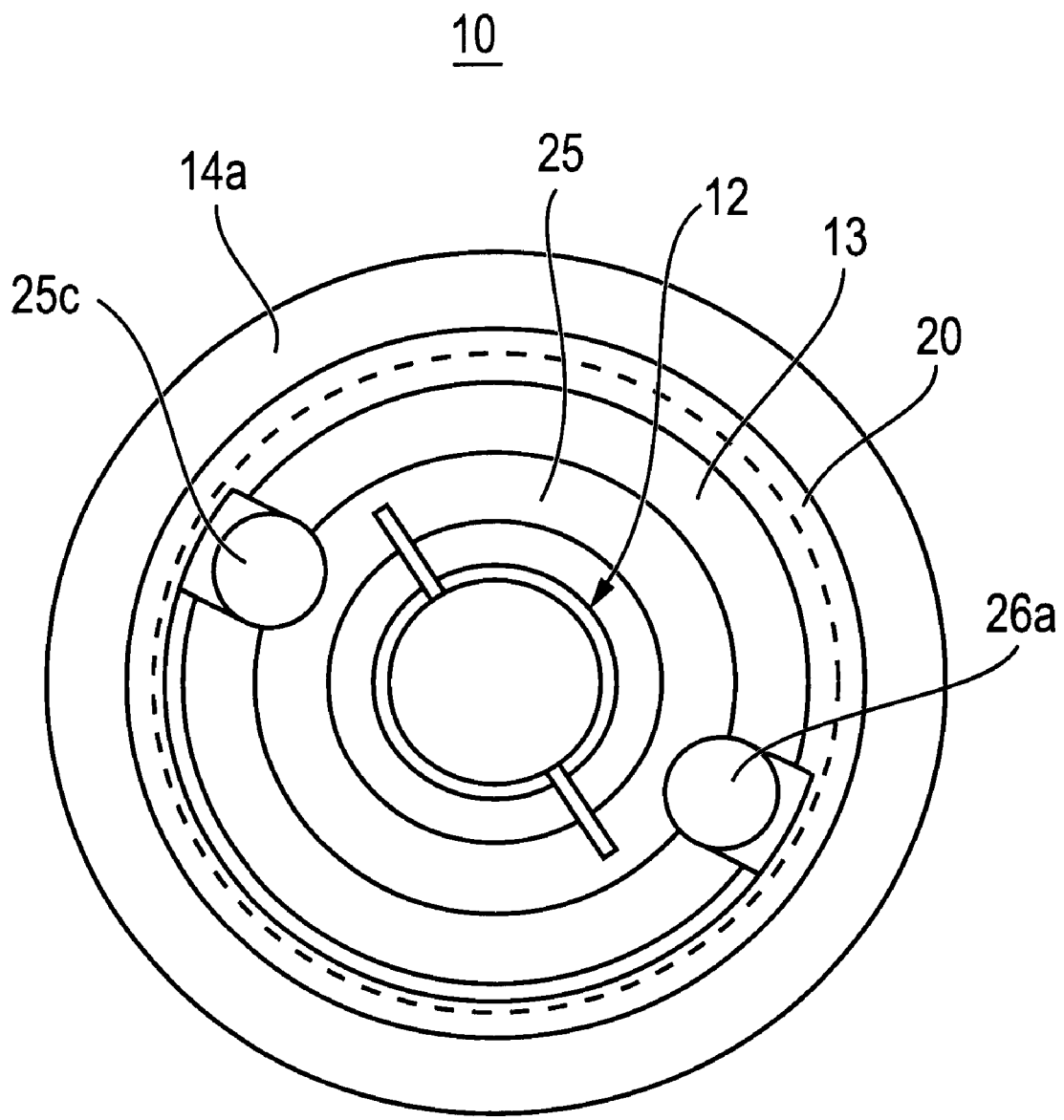
FIG. 4 is a rear view of a grommet of the first embodiment according to the present embodiment.
Figure 5:
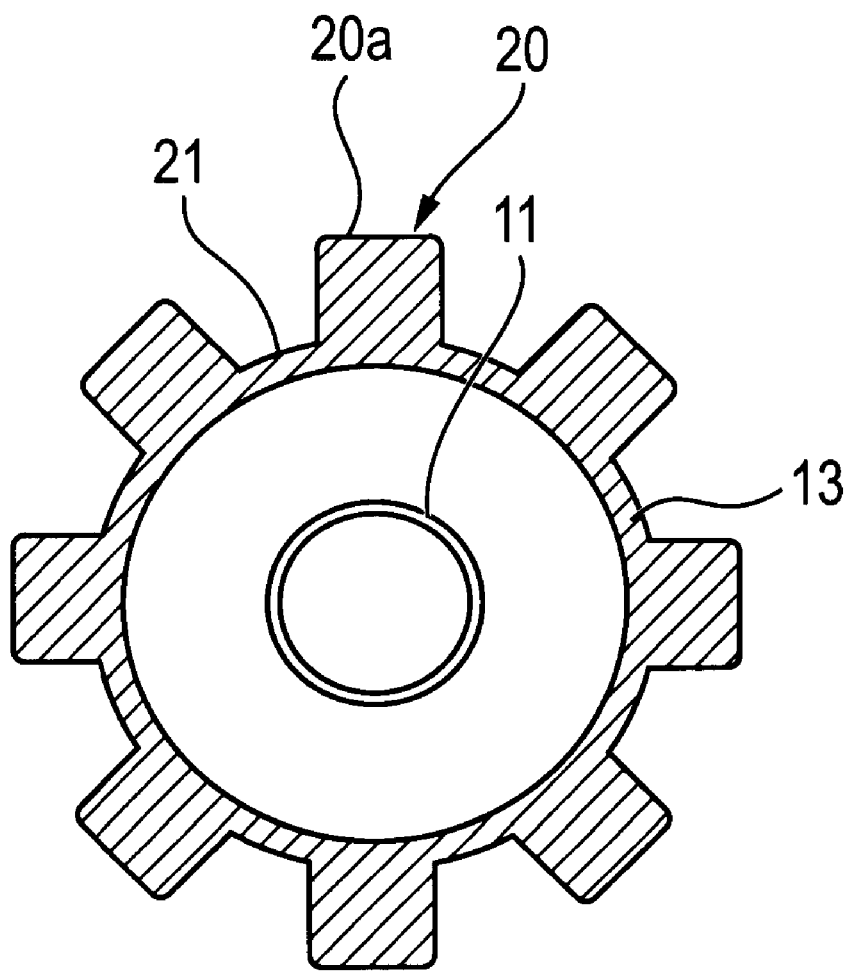
FIG. 5 is a cross-sectional view of the grommet shown in FIG. 2 taken along the line V—V of FIG. 2.
Figure 6:
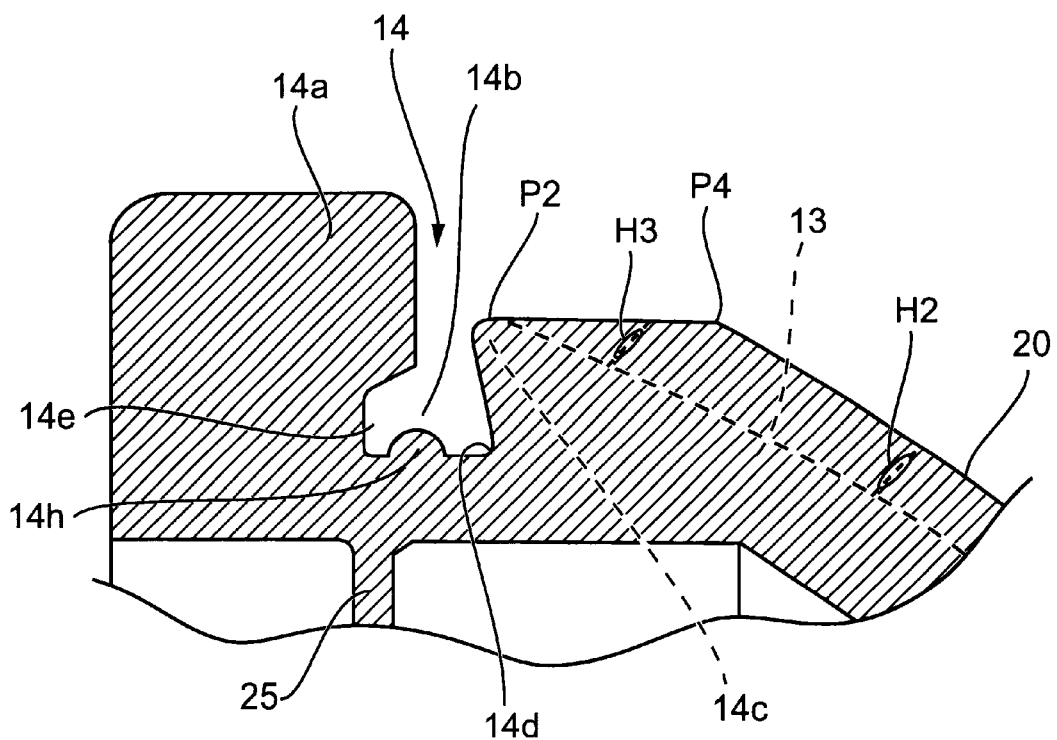
FIG. 6 is a partial enlarged view of the grommet shown in FIG. 2.
Figure 7:
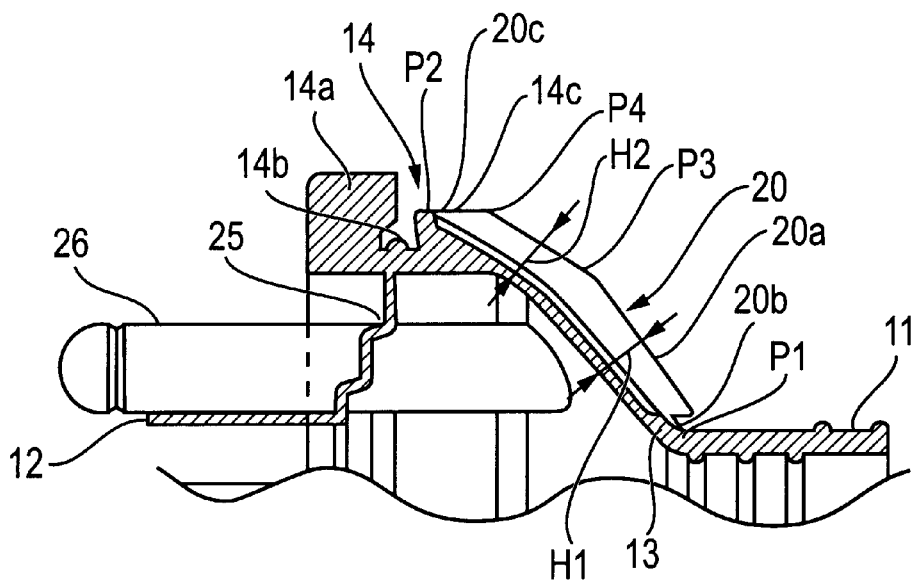
FIG. 7 is an enlarged view of a primary portion of the grommet shown in FIG. 6.
Figure 8A:
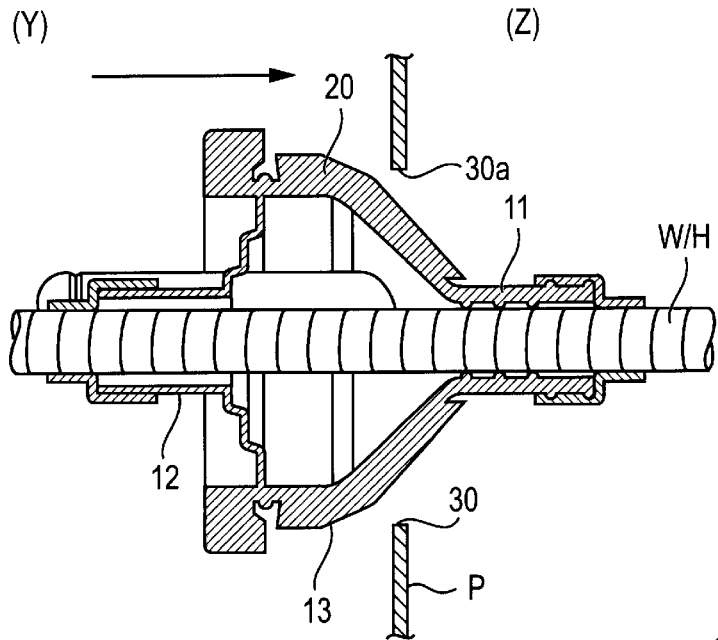
Figure 8B:
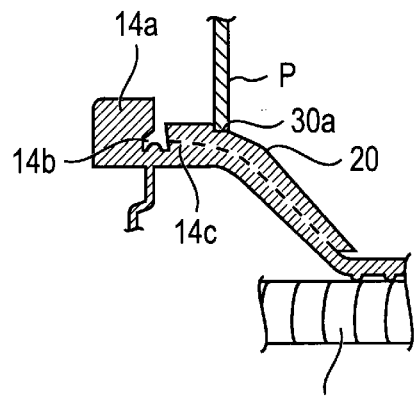
Figure 8C:
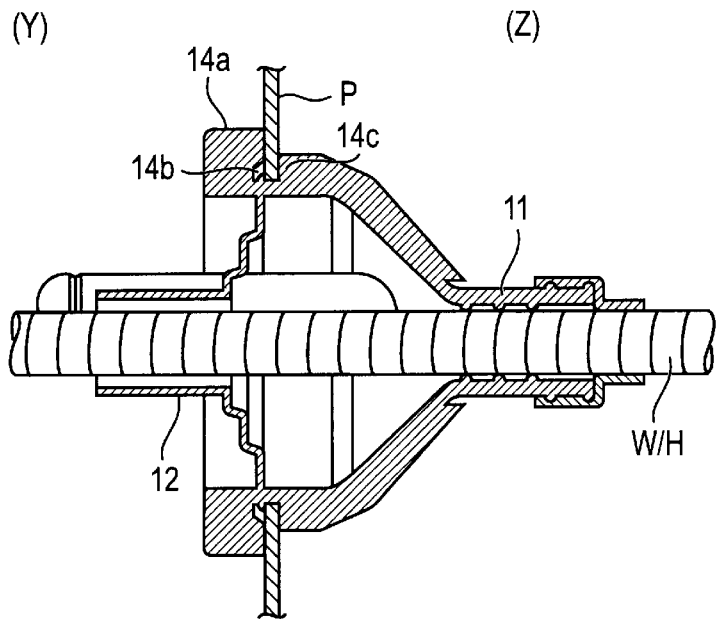
Figure 9A:
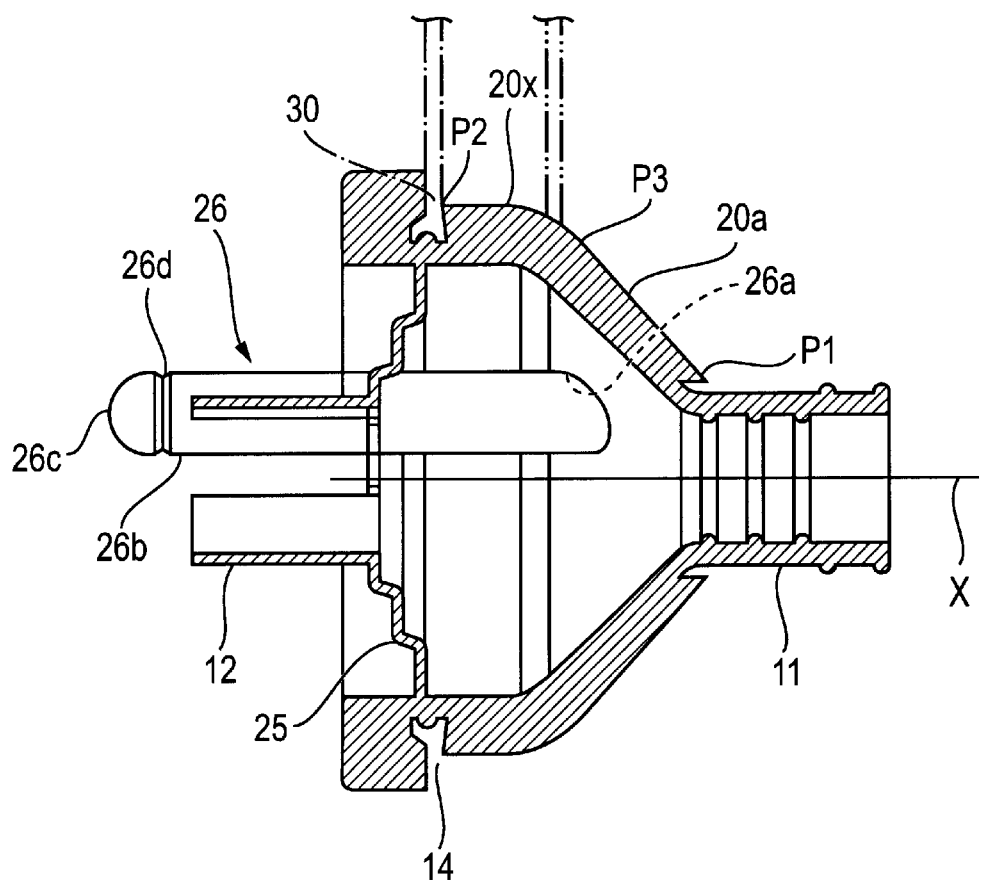
Figure 9B:
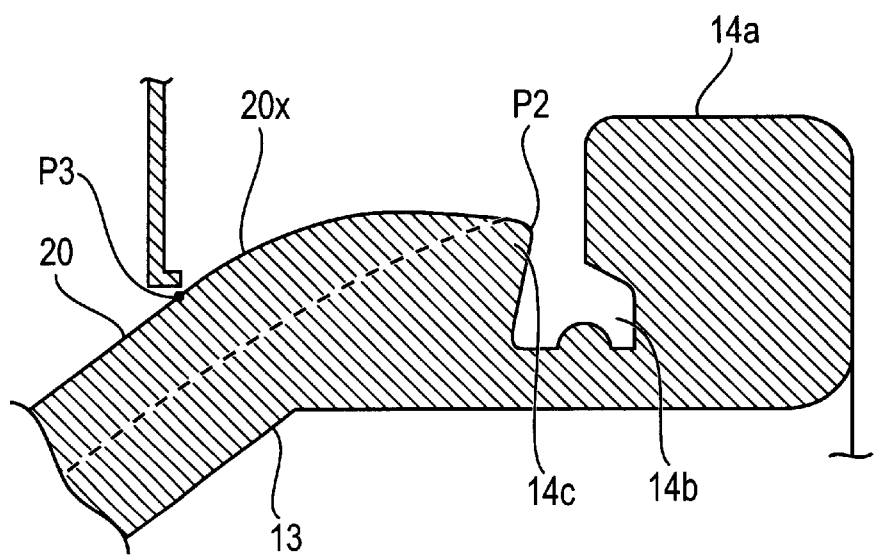
Figure 10:
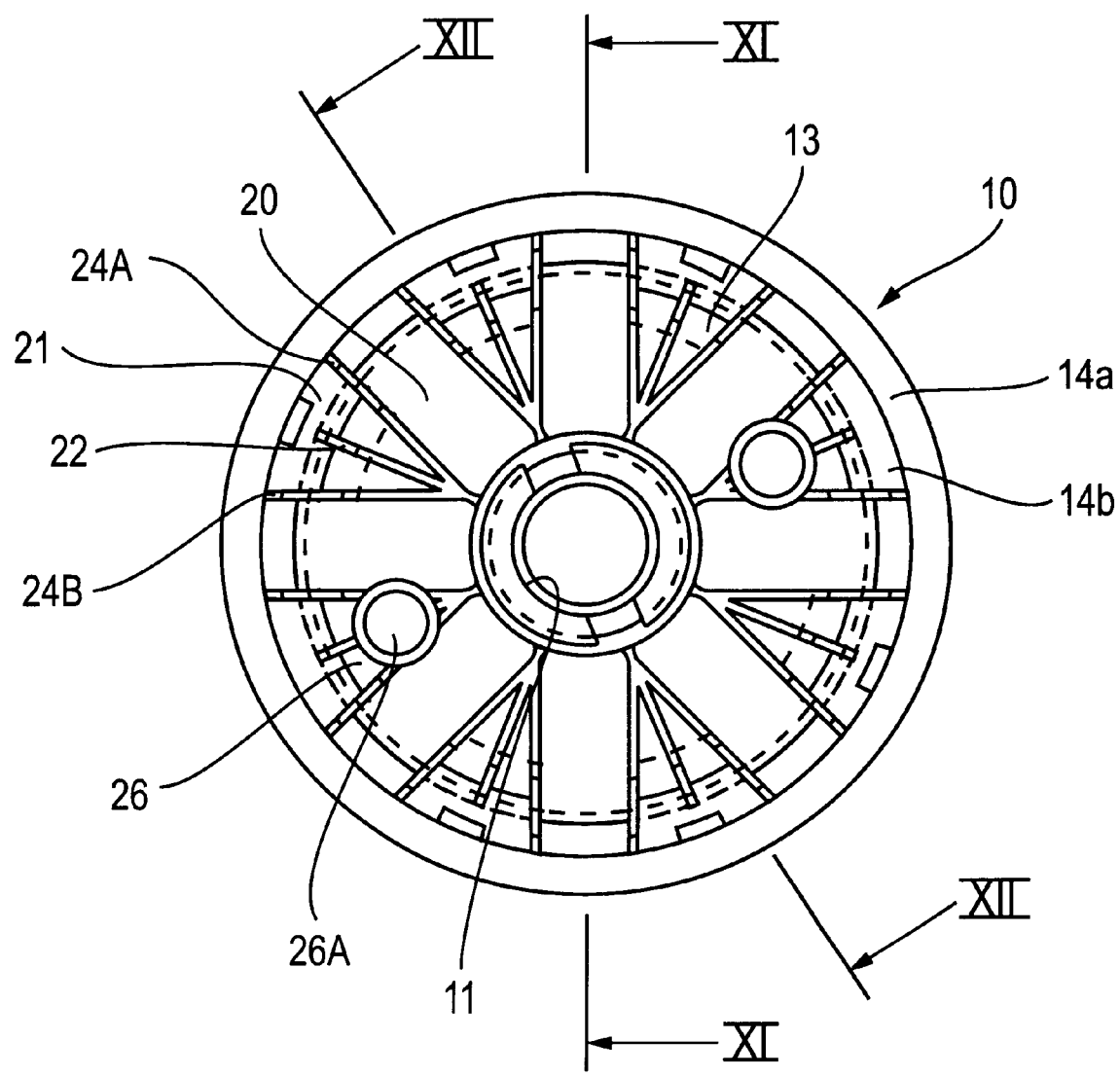
Figure 11:
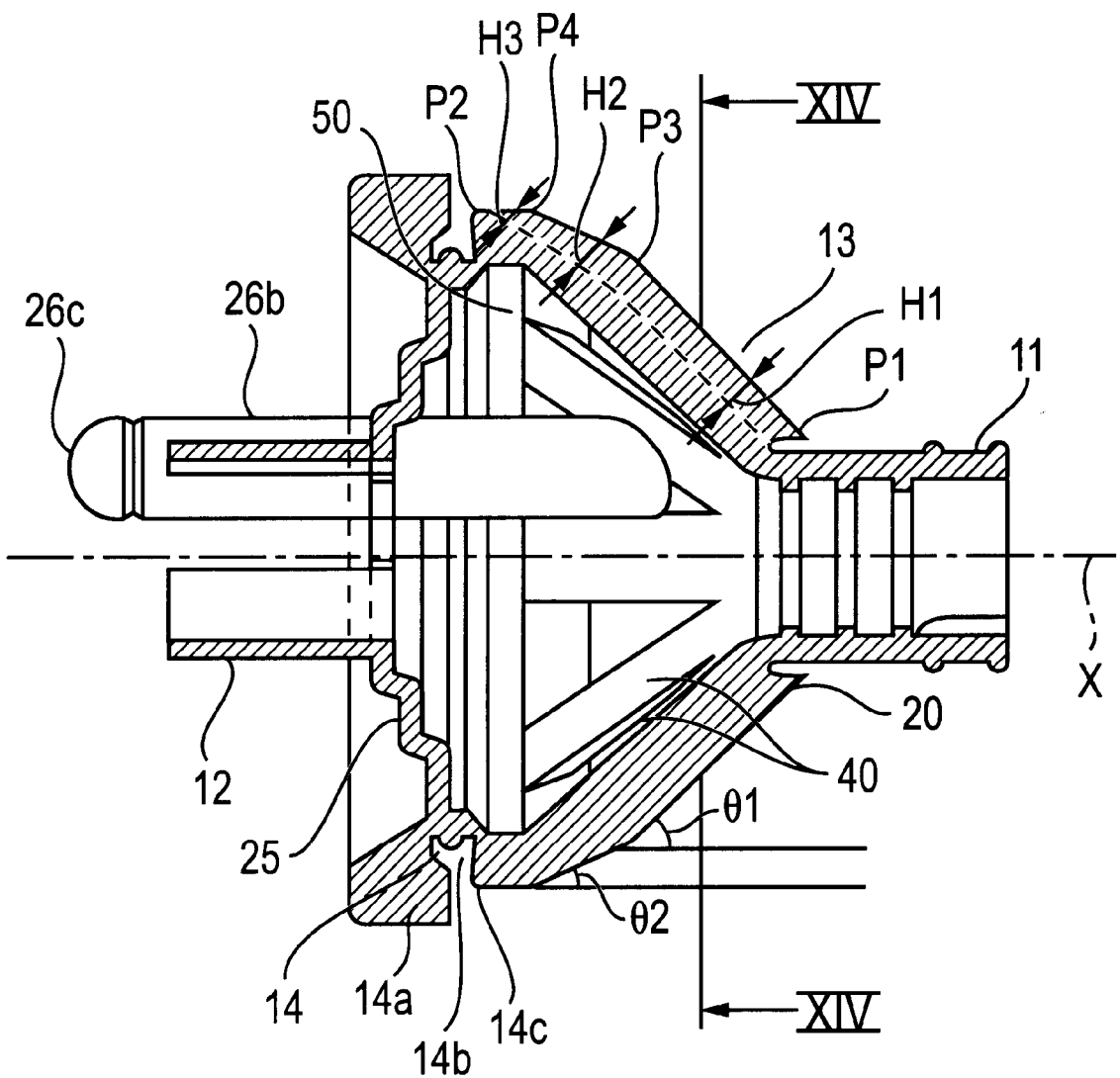
Figure 12:
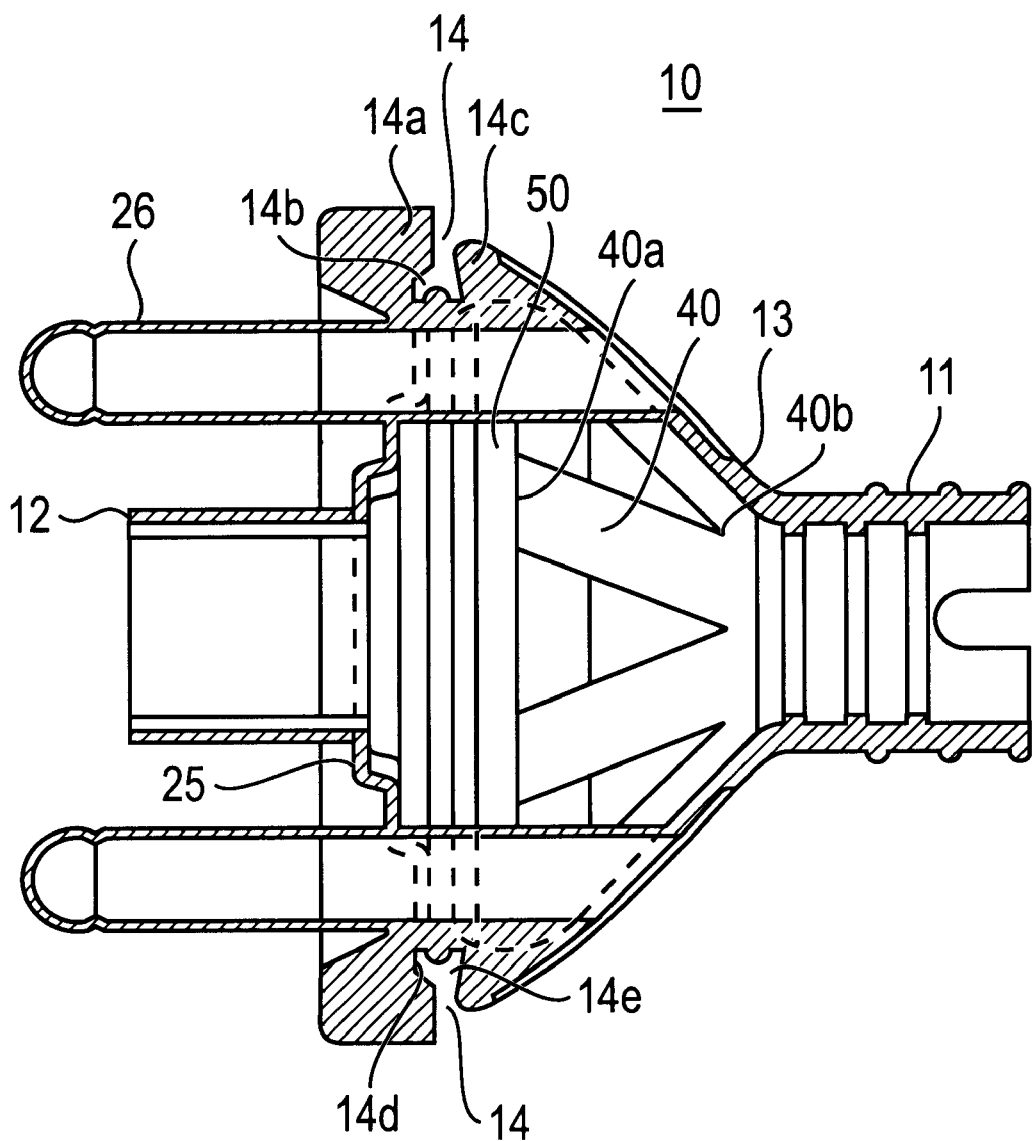
Figure 13:
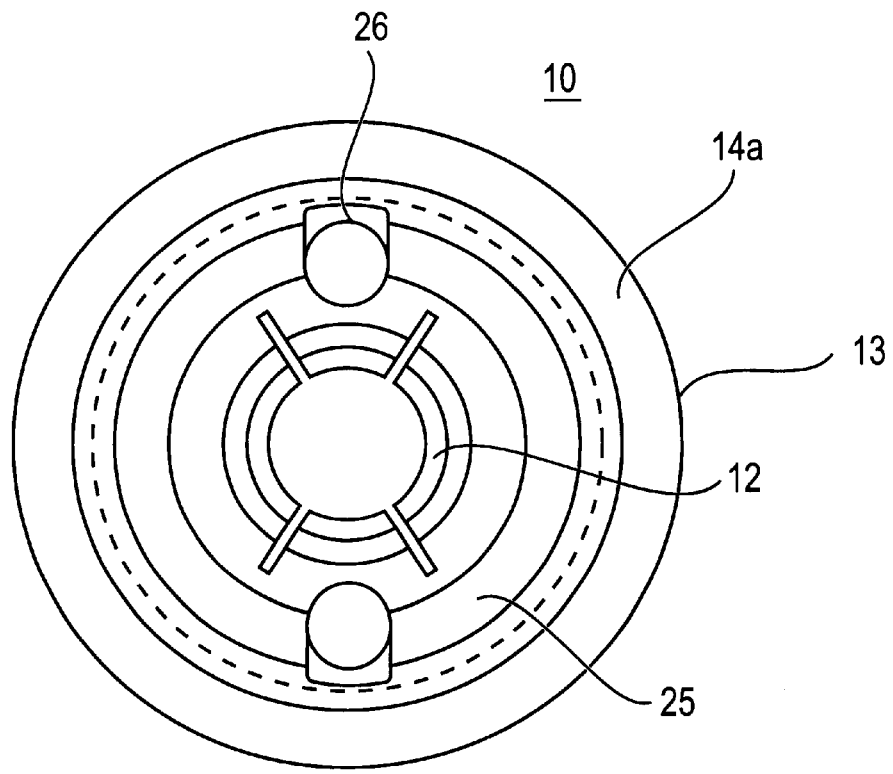
Figure 14:
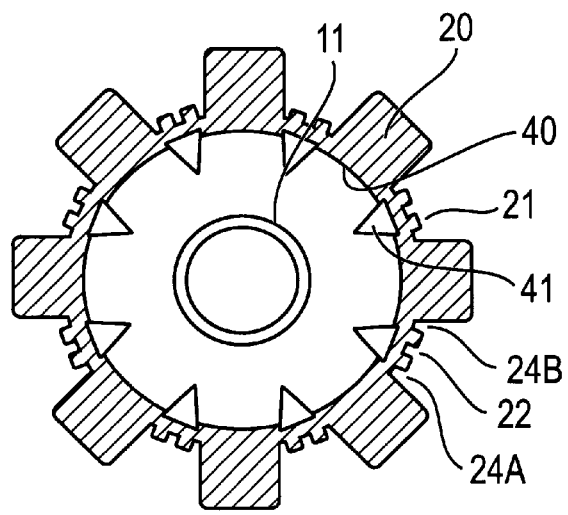
Figure 15:
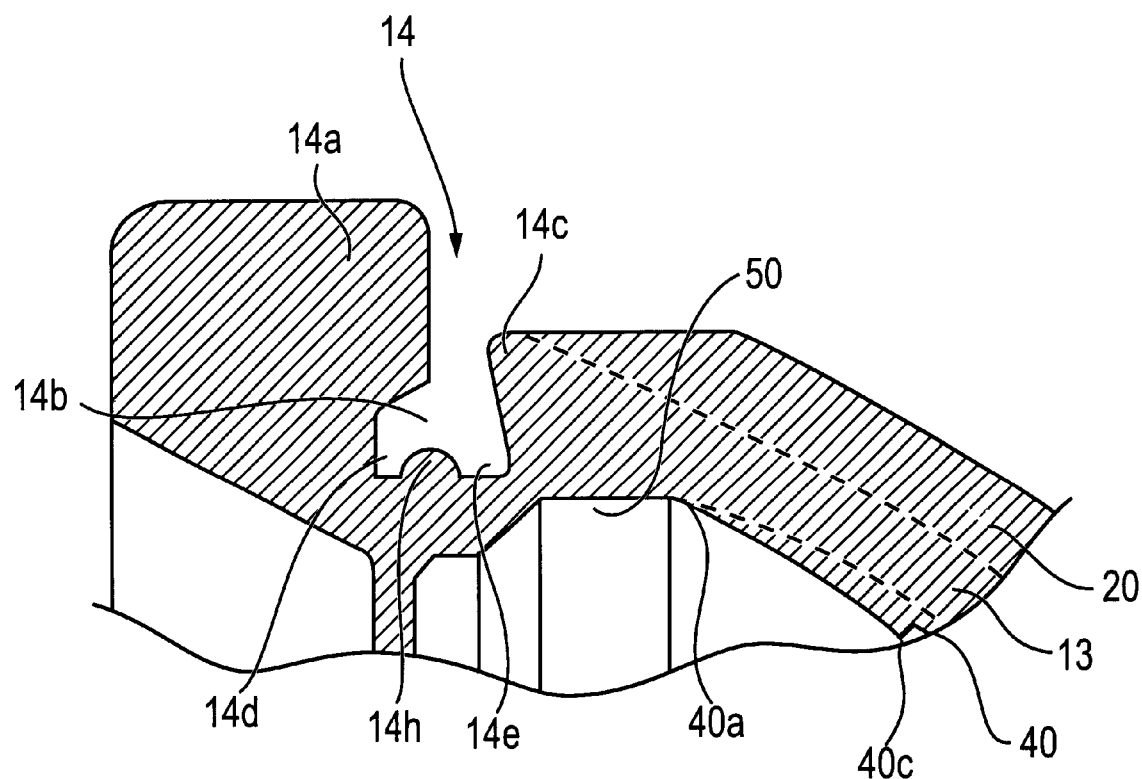
Figure 16A:
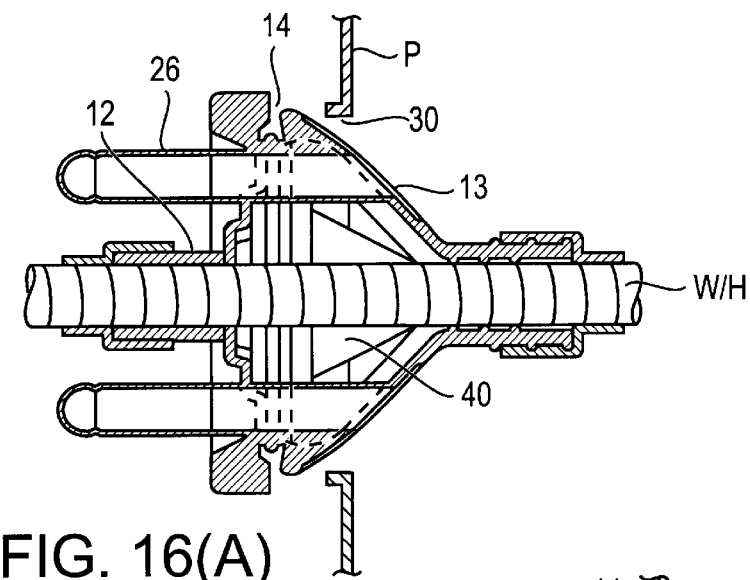
Figure 16B:
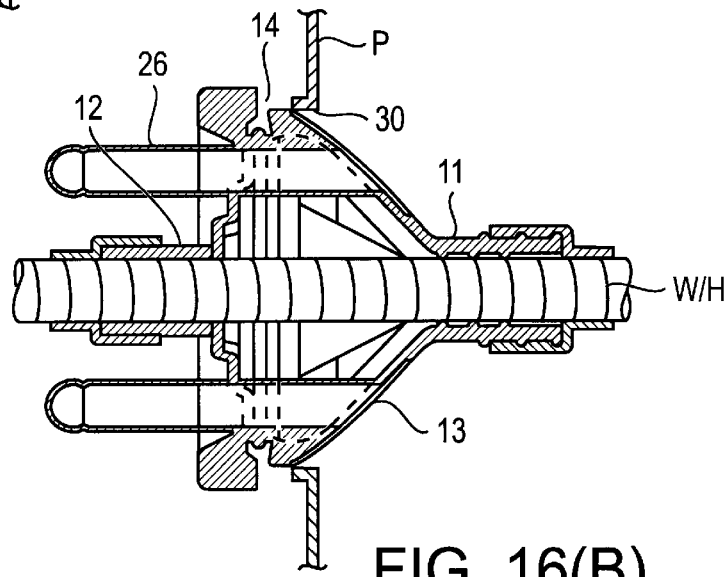
Figure 16C:
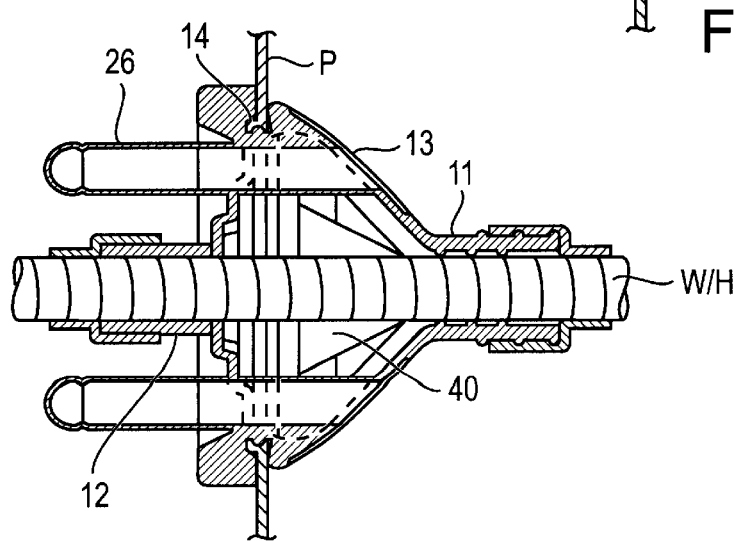
Figure 17:
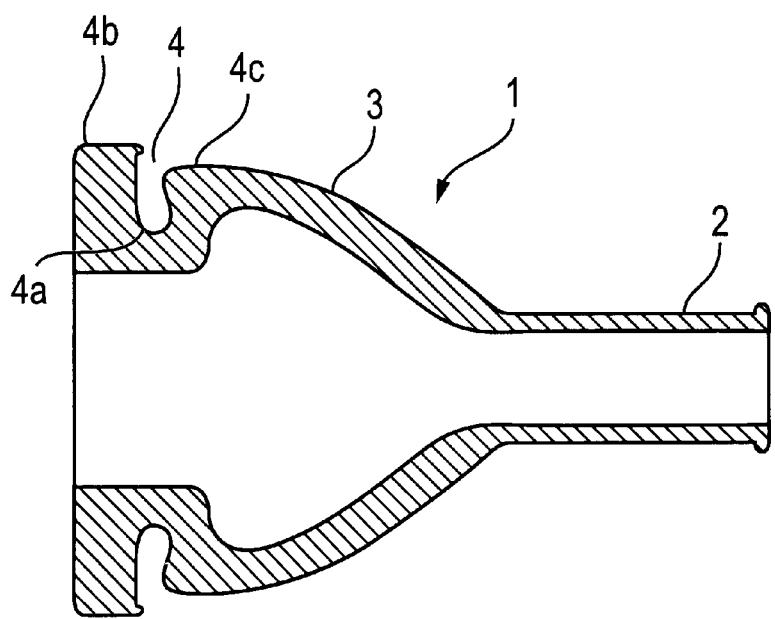
Figure 18:
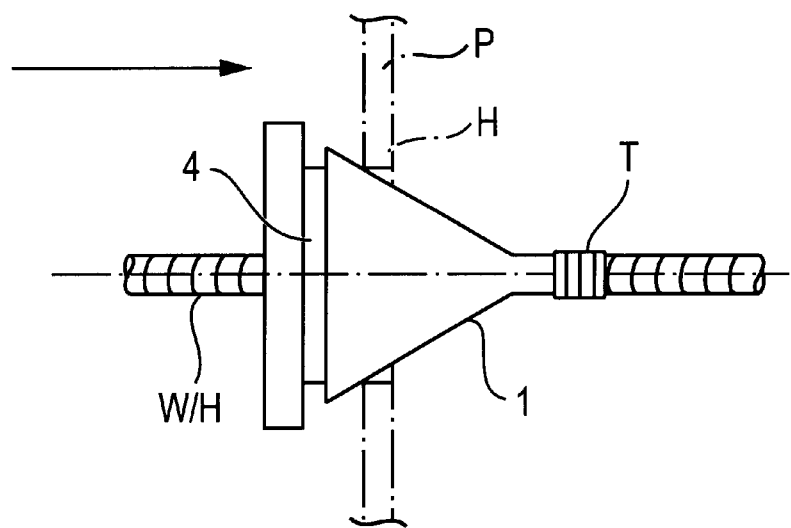
Figure 19A:
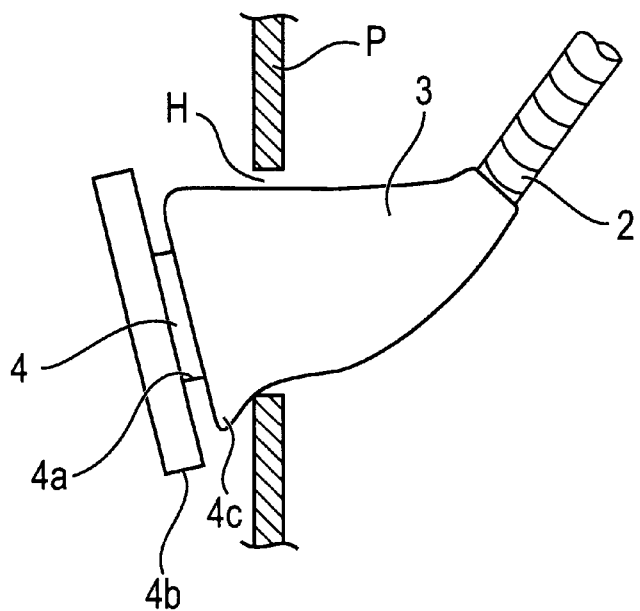

FIGS. 8(A), 8(B) and 8(C) are views illustrating a grommet being inserted into a through hole according to the first embodiment of the present invention;

FIGS. 9(A) and 9(B) are cross-sectional views illustrating primary portions of a grommet according to a second embodiment of the present invention;

FIG. 10 is a front view of a grommet according to a third embodiment of the present invention;

FIG. 11 is a cross-sectional view of the grommet shown in FIG. 10 taken along the line XI—XI of FIG. 10;

FIG. 12 is a cross-sectional view of the grommet shown in FIG. 10 taken along the line XII—XII of FIG. 10;

FIG. 13 is a rear view of the grommet according to the third embodiment of the present embodiment;

FIG. 14 is a cross-sectional view of the grommet shown in FIG. 11 taken along line XIV—XIV of FIG. 11;

FIG. 15 is a partial enlarged view of the grommet shown in FIG. 11;

FIGS. 16(A), 16(B) and 16(C) are views illustrating the grommet of the third embodiment being inserted into a through hole;

FIG. 17 is a cross-sectional view of a conventional grommet;

FIG. 18 is a view illustrating an example of an insertion operation of the conventional grommet into the through hole of an automobile body panel;

FIG. 19(A) is a view illustrating a problem of the conventional grommet; and

Figure 19B:
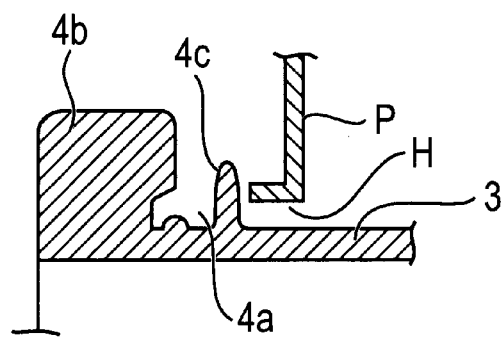

FIG. 19(B) is an enlarged cross-sectional view of a primary portion of (A).

DETAILED DESCRIPTION OF PREFERRED EMBODIMENTS

The embodiments of the present invention are explained in the following with reference to drawings.

FIGS. 1–8 illustrate a first embodiment of the present invention.

A grommet 10 is made of a suitable elastic material, such as an elastic or an elastomer, and is formed unitarily and in one piece. The grommet 10 includes a first small diameter cylindrical portion 11, which is positioned at the front side in an inserting direction, and a second small diameter cylindrical portion 12, which is positioned at the rear side of the inserting direction, and a tapered portion 13 extending between the first small diameter cylindrical portion 11 and the second small diameter cylindrical portion 12. The tapered portion 13 has a generally conical shape whose diameter is enlarged from an end connecting to the first small diameter cylindrical portion 11 to the other end, has a thickened portion around a large diameter end, and an automobile body engagement recessed portion 14 on an outer peripheral surface thereof.

The both side walls of the automobile body engagement recessed portion 14 includes a vertical wall 14a, projecting outwardly and positioned around the large diameter end, a groove 14b and an inclined wall 14c that faces the vertical wall 14a across the groove 14b. The groove 14b has front and rear hollow portions 14d and 14e at the inner part thereof, as well as a lip 14h projecting from the groove bottom surface.

A plurality of outer projecting strip portions 20 are provided on the outer peripheral surface of the tapered portion 13. The plurality of outer projecting strip portion 20 are spaced from each other in a circumferential direction, and extend in the axial direction of the tapered portion 13 between a small diameter side, connecting to the small diameter cylindrical portion 11, and the large diameter side of the inclined wall 14c of the automobile body engagement recessed portion 14c. The outer projecting strip portions 20 have a rib-shape, i.e., project from the outer peripheral surface of the tapered portion 13 to provide a thickened portion and a stepped shape.

In the present embodiment, eight outer projecting strip portions 20 extend in the axial direction between the small diameter end P1 and the large diameter end P2, and have a constant width in the circumferential direction throughout the axial direction. The eight outer projecting strip portions 20 have an identical shape.

In the present embodiment, the width W of each outer projecting strip portion 20 is about 10 mm; and the length L in the axial direction is about 14.8 mm. The outer diameter D of the outer projecting strip portion 20 at the edge of the inclined wall (position P2) is about 76 mm, and the outer diameter at the small diameter end (position P1) is about 63.9 mm.

The projection amount H of the outer projecting strip portion 20 projecting from the outer peripheral surface of the tapered portion 13 is changed at the position of a contact point P3, which contacts an inner peripheral surface 30a of the through hole during the insertion of the grommet 10 into the through hole 30, so that the projection amount H2 between the contact point P3 and the position P2, which is the edge of the inclined wall, is smaller than the projection amount H1 between P3 and the small diameter end P1.

Further, the outer peripheral surface 20a of the outer projecting strip portion 20 extends in parallel to the axial direction X of the grommet between the position P4 and the edge P2 of the inclined wall 14c. At the position P4, the height of the outer surface 20a of the outer projecting strip portion 20 (from the axis) becomes the same as the height of the edge P2 (from the axis) of the inclined wall 14c.

As described above, the projection amount of each outer projecting strip portion 20 has a largest height H1 between P1 at the small diameter end and the small diameter side of the position P3. The projection amount H2 between P3 and P4 satisfies H1>H2. Thus, the outer surface 20a is bent. Further, the projection amount H3 between P4 and the edge P2 of the inclined wall 14c is less than H2 and decreases gradually.

Thus, the inclination angle 0 of the outer surface 20a of each outer projecting strip portion 20 with the axis X changes between two levels, θ1 and θ2. At the small diameter cylindrical portion side, the inclination angle θ1 has the largest angle. At the contact point P3, the inclination angle θ2 is decreased. Further, at the position where the height of the outer surface 20a (from the axis) becomes the same as the height of the edge of the inclined wall 14c, the inclination angle is set to 0. Thus, the shape of the. outer surface 20a changes by bending at three levels.

Since the width of each outer projecting strip portion 20 is constant along the axis X, the outer projecting strip portions 20 are radially spread apart from the small diameter end PI to the large diameter end P2. At the end portion 20b of the outer projecting strip portion 20 at the small diameter end P1, adjacent outer projecting strip portions 20 are arranged close to each other. At the end portion 20c of the outer projecting strip portion 20 at the large diameter side P2, adjacent outer projecting strip portions are spaced from each other. Accordingly, triangular sunken portions 21, which define the outer peripheral surface 13a of the tapered portion 13, are generated so as to be widened from the small diameter side to the large diameter side.

At the end of the large diameter side of the above-described tapered portion 13, a thin end face portion 25 is provided. The second small diameter cylindrical portion 12 extends outwardly from the center of the end face portion 25.

The grommet 10 is further provided with two cable insertion cylindrical portions 26 to connect to option parts.

Each cable insertion cylindrical portion 26 includes an opening 26a in a sunken portion 21 of the outer peripheral surface of the tapered portion 13, passes through the interior of the tapered portion 13, and extends outwardly from the end face portion 25. The end of the extending portion 26b has a closed portion 26c. When a cable is to be inserted thereinto, the cutting portion 26d is cut to make an opening.

As shown in FIGS. 8(A)–8(C), the above-described grommet 10 first engages around the wire harness W/H, and then, the grommet 10 is mounted into the through hole 30 of the automobile body panel P, which is a dash panel dividing the outside (Y) of the passenger compartment from the passenger compartment side (X).

A mounting operation of the above-described grommet 10 is described hereinafter.

The first small diameter cylindrical portion 11 is pressed into the through hole 30 from the outside (Y) of the passenger compartment. At this time, if the grommet 10 is inclined, a portion of the outer projecting strip portions 20 touches the inner peripheral surface of the through hole 30 and contact resistance occurs. Accordingly, the operator corrects the inserting posture of the grommet 10.

In addition, since a plurality of outer projecting strip portions 20 are provided on the outer peripheral surface of the thin tapered portion 13, the stiffness of the tapered portion 13 increases. Accordingly, when the grommet 10 is inserted in an inclined posture, a portion of the tapered portion 13, which is in contact with the inner peripheral surface of the through hole, is positively prevented from being bent and deformed.

When the tapered portion 13 of the grommet 10 is being inserted into the through hole 30 and the contact point P3 of the outer projecting strip portions 20, where the inner diameter of the through hole 30 is equal to the outer diameter of the grommet 10, reaches the position of the through hole 30, the operator feels tactile sensation by the contact of the outer surface 20a of the outer projecting strip portions 20 with the inner peripheral surface of the through hole 30.

From this moment, the operator presses the grommet 10 without stopping and inserts the grommet 10 into the through hole 30 by crushing the outer projecting strip portions 20. At this time, the sunken portion 21 between the outer projecting strip portions 20 smoothly reduces the diameter of the tapered portion 13. In addition, since the inclination angle of the outer projecting strip portion 20 is gentle and the projection amount from the outer peripheral surface of the tapered portion 13 is small, a strong pressing force is not required, and thus, the insertion can be performed with a low inserting force.

Further, when the outer surface 20a of the, outer projecting strip portion 20 reaches the same height as that of the edge of the inclined wall 14a of the automobile body engagement recessed portion 14, from this position P4, the outer surface 20a of the outer projecting strip portions 20 become parallel to the axial direction, and guides the edge of the inclined wall to pass through the through hole 30 in a straight posture.

As described above, the outer surface 20a of the eight outer projecting strip portions 20 is pressed by the inner peripheral surface of the through hole 30, the edge of the inclined wall 14c is forced to pass through the through hole 30 while the diameter of the tapered portion 13 is reduced. When the inclined wall 14c passes through the through hole 30, the original position (shape) is elastically recovered, and the peripheral edge portion of the through hole 30 is pressed into the groove 14b between the inclined wall 14c and the vertical wall 14a. In this condition, the facing surfaces of the inclined wall 14c and the vertical wall 14a are pressed toward each other and contact opposite surfaces of the automobile body panel P, and the inner peripheral surface of the through hole 30 is pressed into contact with the lip 14h projecting from the groove bottom surface. Thus, the grommet 10 engages with the through hole 30 of the automobile body panel P in a sealing condition.

As described above, since the grommet 10 has the outer projecting strip portions 20 on the outer peripheral surface of the tapered portion 13, the operator can correct an inclined insertion posture, the thin tapered portion is reinforced, and bending, which easily occurs at the time of inclined insertion, can be prevented. Thus, even if the grommet 10 is inserted in an inclining posture, the grommet 10 is not prevented from being inserted into the through hole 30.

Further, at the periphery of the edge of the inclined wall 14c, the outer projecting strip portions guide the inclined wall 14c to pass through the through hole 30 in a straight manner. Accordingly, deformation does not occur at the periphery of the edge of the inclined wall, and thus, the inclined wall can pass through the through hole 30 smoothly.

FIGS. 9(A) and 9(B) show a second embodiment, including an arced portion 20X, which is an arced outer surface of the projecting strip portions between the contact point P3 of the outer projecting strip portion 20, at which the outer projecting strip portion 20 has the same height as the bottom surface of the groove 14 (the position contacting the inner peripheral surface of the through hole), and the end P2 of the inclined wall 14c.

In other words, in the first embodiment, a straight line inclined portion is provided between the contact point P3 and the point P4, and a straight line portion parallel with the axis is provided between P4 and P2; however, in the second embodiment, the portion between P3 and P2 has an arced (curved) shape.

Thus, if the outer surface of the outer projecting strip portions 20 has an arced shape between the position where the outer projecting strip portion contacts the inner peripheral surface of the through hole of the panel, even when the grommet is inserted in an inclining posture, the grommet is prevented from being hooked by the inner peripheral surface of the through hole. Thus, the operator can insert the grommet into the through hole smoothly while the insertion angle is being corrected.

FIGS. 10–16(C) show a third embodiment of the present invention.

A grommet 10' is made of any suitable elastic material, such as an elastic or an elastomer, and is formed unitarily and in one piece. The components of the grommet 10', which are the same as those of the first embodiment, are given the same reference numerals, and detailed explanation is omitted.

A plurality of wide inner projecting strip portions 40 are provided on the inner peripheral surface of the tapered portion 13 so as to have a stepped shape. The plurality of inner projecting strip portions 40 are spaced from each other in a circumferential direction, and extend in the axial direction between the small diameter side, connecting to the small diameter cylindrical portion 11, and the periphery of the edge of the inclined wall 14c of the automobile body engagement recessed portion 14.

In the present embodiment, each of the eight inner projecting strip portions 40 extends in the axial direction, and has a constant width in a circumferential direction, throughout the axial direction. The eight inner projecting strip portions 40 have an identical shape.

On the inner peripheral surface of the tapered portion 13, a recessed portion 50 is provided to have a thinned portion from the base position of the automobile body engagement recessed portion 14 toward the inclined wall 14c side. The end 40a of the inner projecting strip portion 40 is located at the recessed portion 50. On the curved inner peripheral surface of the tapered portion 13, the inner projecting strip portions 40 project so that the inner surface of the inner projecting strip portions 40 extend linearly between a proximal end 40b at the small diameter side and the end 40a.

Further, similar to the first embodiment, a plurality of outer projecting strip portions 20 are provided on the outer peripheral surface of the tapered portion 13. The structure of the outer plurality of outer projecting strip portions 20 of the present embodiment is the same as that of the first embodiment. Accordingly, detailed explanation is omitted here. The outer projecting strip portions 20 are provided at a position opposing the inner projecting strip portions 40, and have the same width as that of the inner projecting strip portions.

Since the width W of each inner projecting strip portion 40 and outer projecting strip portion 20 is constant along the axial direction, the inner and outer projecting strip portions, which are respectively provided on the inner and outer surface of the tapered portion 13, are radially spread from the small diameter end P1 to the larger diameter end P2. At the small diameter end P1, adjacent inner projecting strip portions 40 and adjacent outer projecting strip portions 20 are respectively arranged close to each other. At the large diameter end P2, the adjacent inner projecting strip portions 40 and the adjacent outer projecting strip portions 20 are spaced from each other. Triangle sunken recessed portions 21, which define the outer peripheral surface 13a of the tapered portion 13, and triangle sunken portions 41, which define the inner peripheral surface, are respectively provided interior and exterior of the tapered portion 13. These inner and outer sunken portions 41 and 21 widen along a direction from the small diameter side to the large diameter side.

On the outer surface of the sunken portions 21 between the outer projecting strip portions 20, a center groove 22 (FIG. 14) is provided at the center between two adjacent outer projecting strip portions 20 in the circumferential direction, and outer side grooves 24A and 24B are provided at the proximal portion of the outer projecting strip portion 20. The outer side grooves 24A and 24B extend to the position of the point P4, and the center groove 22 extends to the position of the point P3.

As shown in FIGS. 16(A)–16(C), the above-described grommet 10' engages around the wire harness W/H, and the grommet 10' is mounted into the through hole 30 of the automobile body panel P, which is a dash panel dividing the exterior (Y) of the passenger compartment from the passenger compartment side (Z).

A mounting operation of the above-described grommet 10' is described hereinafter.

The first small diameter cylindrical portion 11 is pressed and inserted into the through hole 30 from the outside (Y) of the passenger compartment. At this time, similar to the first embodiment, if the grommet 10' is inclined, a portion of the outer projecting strip portions 20 touches the inner peripheral surface of the through hole 30 and contact resistance occurs. Accordingly, the operator corrects the inserting posture of the grommet 10'.

In addition, since a plurality of outer projecting strip portions 20 and a plurality of inner projection strip portions 40 are respectively provided on the outer peripheral surface and the inner peripheral surface of the thin tapered portion 13, the stiffness of the tapered portion 13 increases. Accordingly, when the grommet 10' is inserted in an inclining posture, a portion of the tapered portion 13, which is in contact with the inner peripheral surface of the through hole, is positively prevented from being bent and deformed.

When the tapered portion 13 of the grommet 10' is being inserted into the through hole 30 and reaches the contact point P3 of the projecting strip portion 20, where the inner diameter of the through hole 30 equal to the outer diameter of the grommet 10' reaches the position of the through hole 30, the operator experiences a tactile sensation by the contact of the outer surface 20a of the outer projecting strip portions 20 with the inner peripheral surface of the through hole 30.

From this moment, the operator presses the grommet 10' without stopping and inserts the grommet 10' into the through hole 30 by deforming the outer projecting strip portion 20. At this time, the sunken portions 21 between the outer projecting strip portions 20 and the sunken portions 41 between the inner projecting strip portions 40 smoothly reduce the diameter of the tapered portion 13. In addition, the sunken portion 21 includes the grooves 22, 24A and 24B. Accordingly, since the thin sunken portions 21 and 41 are deformed and bent to form an outwardly swollen ridge shape between the outer projecting strip portions 20, which reduce the diameter of the tapered portions, the grommet 10' can be smoothly deformed. In addition, similar to the first embodiment, since the inclination angle of the outer projecting strip portions 20 is gentle and the projection amount from the outer peripheral surface of the tapered portion 13 is small, a strong pressing force is not required, and thus, the insertion of the grommet 10' can be performed with a low inserting force.

Further, when the outer surface 20a of the outer projecting strip portions 20 reaches the same height of the edge of the inclined wall 14c of the automobile body engagement recessed portion 14, the outer surface 20a of the outer projecting strip portions 20 becomes parallel with the axial direction from the position P4, and guides the grommet 10' so that the edge-of the inclined wall passes through the through hole 30 in a straight posture.

As described above, similar to the first embodiment, the outer surface 20a of the eight outer projecting strip portions 20 is pressed by the inner peripheral surface of the through hole 30, the opening projection edge of the inclined wall 14c is forced to pass through the through hole 30 while the diameter of the tapered portion 13 is reduced. When the inclined wall 14c passes through the rough hole 30, the original position (shape) is elastically recovered, and the peripheral edge portion of the through hole 30 is pressed into the groove 14b between the inclined wall 14c and the vertical wall 14a. In this condition, the facing surfaces of the inclined wall 14c and the vertical wall 14a are pressed into and contact opposite surfaces of the automobile body panel P, and the inner peripheral surface of the through hole 30 is pressed into and contacts the lip 14h projecting from the groove bottom surface. Thus, the grommet 10' engages with the through hole 30 of the automobile body panel P in a sealing condition.

Similar to the first embodiment, since the grommet 10' has the outer projecting strip portions 20 on the outer peripheral surface of the tapered portion 13, the operator can correct an inclined insertion posture, the thin tapered portion is reinforced, and bending, which is likely to occur at the time of inclined insertion, can be prevented. Thus, even if the grommet 10' is inserted in an inclining posture, the grommet 10' is not prevented from being inserted into the through hole 30.

Further, at the periphery of the edge of the inclined wall 14c, the outer projecting strip portions guide the grommet 10' so that the inclined wall 14c passes though the through hole 30 in a straight manner. Accordingly, deformation does not occur at the periphery of the edge of the inclined wall, and thus, the inclined wall can passes through the through hole 30 smoothly.

Further, since the inner projecting strip portions 40 and the outer projecting strip portions 20 ensure the stiffness of the tapered portion 13, the grommet 10' is prevented from being extended while the grommet 10' is pressed into the through hole 30, and the insertion stroke can be shortened.

The present invention is not limited to the embodiments described above. The number of the outer and inner projecting strip portions is not limited to eight, rather, it can be equal to or more than four and equal to or less than ten. Thus, the number can be suitably determined based upon the relationship with thickness of the inner and outer projecting strip portions.

Further, the cable insertion cylindrical portion for the optional parts is not required to be provided.

In addition, needless to say, the through hole can have an oval shape and a grommet having the tapered portion with an oval shape cross section can also be used. Any other suitable complementary shapes for the through hole and the grommet may be utilized, as will be apparent to those skilled in the art.

As clearly described above, the outer projecting strip portions project from the outer peripheral surface of the tapered portion to extend in the axial direction and to be spaced from each other in the circumferential direction. Accordingly, when the grommet is inserted in an inclining posture, since the projecting strip portions touch the inner peripheral surface of the through hole, an operator can become aware of the inclined insertion and correct the insertion posture. Further, when one side of the tapered portion of the grommet touches the inner peripheral surface of the through hole due to the inclined insertion, since the outer projecting strip portions increase the stiffness of the tapered portion, the case in which the tapered portion bends and cannot be inserted, does not occur.

As clearly described above, the grommet according to the present invention has inner projecting strip portions that project from the inner peripheral surface of the tapered portion to extend in the axial direction and to be spaced from each other in the circumferential direction. Accordingly, the stiffness can be increased without enlarging the profile of the grommet. Further, the grommet is prevented from being deformed so as to be flipped over (warped outwardly) and from being extended, during the inclined insertion of the grommet into the through hole of the automobile body. Thus, the insertion stroke can be shortened.

In addition, the outer projecting strip portions and the inner projecting strip portions are provided at an identical position (opposing to each other), and the sunken portion is provided between adjacent inner and outer projecting strip portions. Thus, the stiffness is increased, and at the same time, bending in a direction reducing the diameter of the tapered portion can be secured. Accordingly, the operability of insertion of the grommet into the through hole is not decreased.

Furthermore, at the position where the outer projecting strip portions contact the inner peripheral surface of the through hole, since the inclination angle of the outer surface of the projecting strip portions is changed, the operator experiences a tactile sensation. Accordingly, when the grommet is pressed without stopping from this position, the grommet mounting operation becomes efficient.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Applications No. 2000-288700, filed on Sep. 22, 2000, No. 2001-017532, filed on Jan. 25, 2001 and No. 2001-017561, filed on Jan. 25, 2001, which are herein expressly incorporated by reference in its entirety.

What is claimed is:

1. A grommet configured to engage around an outer periphery of a wire harness and to be mounted in a through hole of an automobile body panel, the grommet comprising:
   a generally cylindrical portion;
   a tapered portion extending from one end of the generally cylindrical portion, the tapered portion including an automobile body engagement recessed portion provided on an outer peripheral surface of the tapered portion to engage with the automobile body panel; and
   a plurality of projecting strip portions provided on an outer peripheral surface of the tapered portion, the plurality of projecting strip portions extending in an axial direction of the tapered portion and being spaced from each other in a circumferential direction,
   wherein a projection amount of the plurality of projecting strip portions is changed at a contact point in the axial direction so that a first projection amount between the contact point and a large diameter side end of the plurality of projecting strip portions is smaller than a second projection amount of the plurality of projecting strip portions between the contact point and a small diameter side end of the plurality of projecting strip portions,
   wherein the contact point is located substantially at a position where an outer surface of the plurality of projecting strip portions first contacts an inner peripheral surface of the through hole when the grommet is inserted into the through hole from the end of the grommet having the generally cylindrical portion.

2. The grommet according to claim 1, wherein an outer surface of each of the plurality of projecting strip portions has an arced shape between the contact point and the large diameter side end.

3. The grommet according to claim 1, wherein an outer peripheral surface of each of the plurality of projecting strip portions is bent at the contact point so as to have different inclination angles.

4. The grommet according to claim 3, wherein the outer surface of each of the plurality of projecting strip portions extends parallel to the axial direction from a position where a height of the plurality of projecting strip portions from an axis of the grommet becomes equal to a height of an edge of a small-diameter-side wall of the automobile body engagement recessed portion from the axis.

5. The grommet according to claim 1, wherein each of the plurality of projecting strip portions provided on the tapered portion extends between an end connecting to the generally cylindrical portion and an edge of a small-diameter-side wall of the automobile body engagement recessed portion.

6. A grommet configured to be engaged around an outer periphery of a wire harness and to be mounted in a through hole of an automobile body panel, the grommet comprising:
   a generally cylindrical portion;
   a tapered portion extending from one end of the generally cylindrical portion, the tapered portion including an automobile body engagement recessed portion provided on an outer peripheral surface of the tapered portion to engage with the automobile body panel;
   a plurality of outer projecting strip portions provided on an outer peripheral surface of the tapered portion, the plurality of outer projecting strip portions extending in an axial direction of the tapered portion and being spaced from each other in a circumferential direction; and
   a plurality of inner projecting strip portions provided on an inner peripheral surface of the tapered portion, the plurality of inner projecting strip portions extending in the axial direction of the tapered portion and being spaced from each other in the circumferential direction;
   wherein the outer projecting strip portions and the inner projecting strip portions are positioned at corresponding locations.

7. The grommet according to claim 6, wherein a projection amount of the plurality of outer projecting strip portions is changed at a contact point in the axial direction so that a first projection amount between the contact point and a large diameter side end of the plurality of outer projecting strip portions is smaller than a second projection amount of the plurality of outer projecting strip portions between the contact point and a small diameter side end of the plurality of outer projecting strip portions.

8. The grommet according to claim 7, wherein the contact point is located substantially at a position where an outer surface of each of the plurality of projecting strip portions first contact an inner peripheral surface of the through hole when the grommet is inserted into the through hole from the end of the grommet having the generally cylindrical portion.

9. The grommet according to claim 6, wherein each of said plurality of inner projecting strip portions is positioned at a location corresponding to, and opposite from, a respective one of said plurality of outer projecting strip portions.

10. A grommet configured to be engaged around an outer periphery of a wire harness and to be mounted in a through hole of an automobile body panel, the grommet comprising:
    a generally cylindrical portion;
    a tapered portion extending from one end of the generally cylindrical portion, the tapered portion including an automobile body engagement recessed portion provided on an outer peripheral surface of the tapered portion to engage with the automobile body panel;
    a plurality of outer projecting strip portions provided on an outer peripheral surface of the tapered portion, the plurality of outer projecting strip portions extending in an axial direction of the tapered portion and being spaced from each other in a circumferential direction; and
    a plurality of inner projecting strip portions provided on an inner peripheral surface of the tapered portion, the plurality of inner projecting strip portions extending in the axial direction of the tapered portion and being spaced from each other in the circumferential direction;

wherein a projection amount of the plurality of outer projecting strip portions is changed at a contact point in the axial direction so that a first projection amount between the contact point and a large diameter side end of the plurality of outer projecting strip portions is smaller than a second projection amount of the plurality of outer projecting strip portions between the contact point and a small diameter side end of the plurality of outer projecting strip portions.

11. The grommet according to claim 10, wherein the contact point is located substantially at a position where an outer surface of each of the plurality of projecting strip portions first contact an inner peripheral surface of the through hole when the grommet is inserted into the through hole from the end of the grommet having the generally cylindrical portion.

12. The grommet according to claim 10, wherein each of said plurality of inner projecting strip portions is positioned at a location corresponding to, and opposite from, a respective one of said plurality of outer projecting strip portions.

* * * * *